Sept. 30, 1958  C. E. STERNBURGH  2,854,537
MAGNETIC CIRCUIT BREAKER FOR AUTOMOTIVE ELECTRIC CIRCUITS
Filed Sept. 10, 1956  2 Sheets-Sheet 1
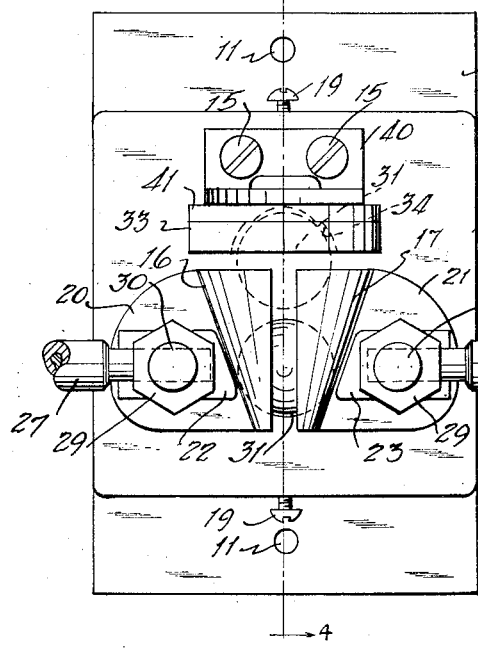
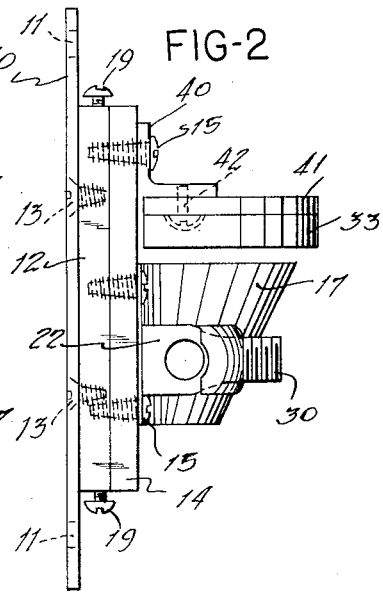
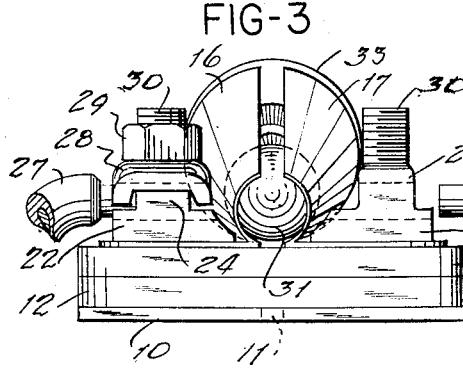
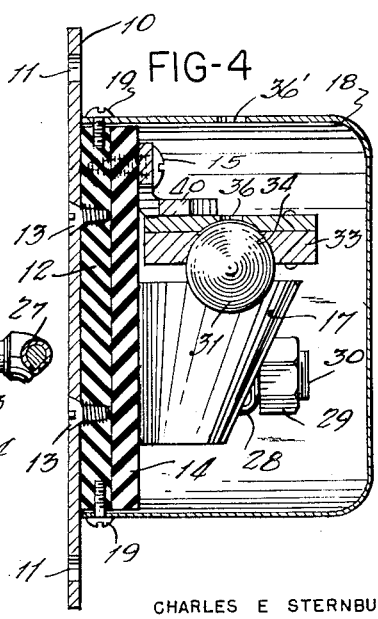
CHARLES E STERNBURGH
*INVENTOR.*
BY Cecil L. Wood
ATTORNEY Sept. 30, 1958 C. E. STERNBURGH 2,854,537
MAGNETIC CIRCUIT BREAKER FOR AUTOMOTIVE ELECTRIC CIRCUITS
Filed Sept. 10, 1956 2 Sheets—Sheet 2
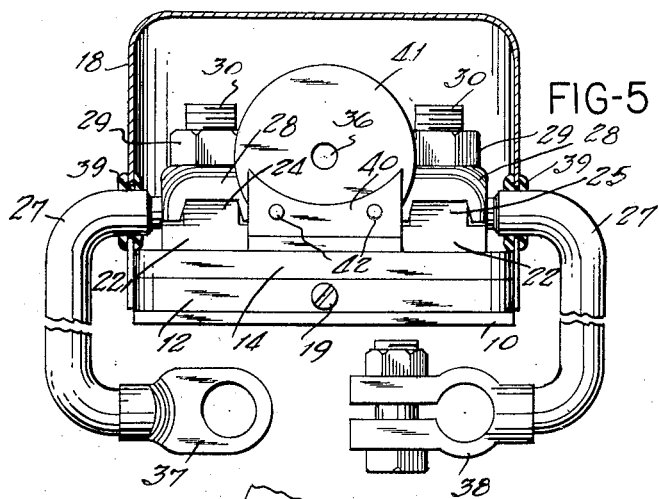
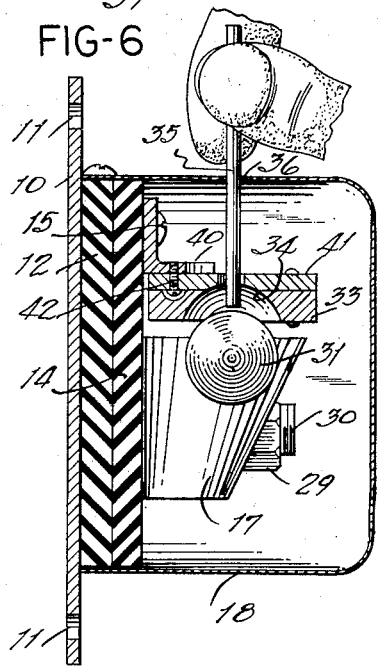
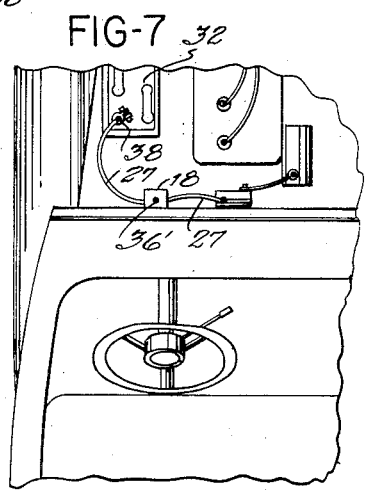
CHARLES E STERNBURGH
*INVENTOR.*
BY
ATTORNEY United States Patent Office 2,854,537
Patented Sept. 30, 1958

2,854,537

MAGNETIC CIRCUIT BREAKER FOR AUTOMOTIVE ELECTRIC CIRCUITS

Charles E. Sternburgh, Fort Worth, Tex., assignor of one-third to Edward R. Stagg and Charlene B. Stagg Application September 10, 1956, Serial No. 608,768

5 Claims. (Cl. 200—61.5)

This invention relates to devices for breaking an ignition and electrical circuit on motor vehicles, such as described in Letters Patent No. 2,763,744, dated September 18, 1956, and issued to Charles E. Sternburgh, for interrupting the electrical circuits in an overturned motor vehicle, and it has particular reference to an effective device by which all electrical current, usually supplied by batteries, can be immediately and permanently interrupted in the event of upset of the vehicle to prevent damage by fire to the occupants or the vehicle itself.

It is an object of the invention to provide a device by which the ignition circuit, or other electrical circuits of the vehicle, including airplanes, can be broken so that a minimum of damage can result from collision or upset, and especially in reducing or eliminating the hazard of fire which usually results when a motor vehicle is overturned through accidents caused by inadvertence or misadventure in the operation of an automobile or aircraft.

A prime object of the invention is that of providing apparatus by which the electrical circuit, when broken, must remain so until manually reconnected, and affording a positive means for breaking the circuit and maintaining the same open until manually closed, thus insuring safety to the occupants against fire hazard which is a constant menace to motor vehicles involved in serious accidents, especially when overturned, and when combustible fuel is spilled about the wreckage.

Broadly, the invention contemplates the provision of a compact and economical unit which is capable of easy installation in the electrical circuit of an automobile or aircraft, and inconspicuously located so that when the vehicle is upset, or caused to assume a position inconsistent with its operative plane, the electrical system will become inoperative and avoid the danger of fire.

While the foregoing objects are paramount, other and lesser objects will become manifest as the description proceeds, taken in connection with the appended drawings wherein:

Figure 1 is a front elevational view of the invention, with the cover removed, showing the ball coupling between the electrical conductors providing the electrical circuit of a vehicle.

Figure 2 is a side elevational view of the invention, showing the cover removed, and illustrating the conical coupler receptacle with the magnet thereabove.

Figure 3 is an inverted plan view of the invention showing the ball coupler in contact position.

Figure 4 is a vertical sectional view of the invention on lines 4—4 of Figure 1 illustrating the ball coupler in inoperative position, retained by the magnet.

Figure 5 is a plan view of the invention, showing the electrical conductors connected thereto, and showing the cover in partial transverse section.

Figure 6 is another vertical sectional view, on lines 4—4 of Figure 1, illustrating the manner of releasing the ball coupler from the magnet, and Figure 7 fragmentarily illustrates an automobile schematically showing the installation of the invention.

The invention is designed for installation in a motor vehicle, or aircraft, in front of the firewall and under the hood, or motor enclosure, as indicated in the illustration shown in Figure 7. The device comprises a mounting plate 10 of metal or plastic having a plurality of apertures 11 therein for the application of screws or bolts for securing the same. Attached to the base plate 10 is an insulated plate 12 by screws 13, and to the plate 12 is attached a plate 14, of similar material, by screws 15 which also serve to retain the semi-conical conductor members 16 and 17 formed in right- and left-hand sections as shown particularly in Figures 1 and 3. A cover 18 is provided to enclose the conductor members 16 and 17, with their associated parts, and this device is secured by screws 19, or other suitable device, shown in Figures 1, 2, 4 and 6.

The semi-conical conductor members 16 and 17 are formed of a suitable conductive metal, such as copper, and have integral flanges 20 and 21 secured by the screws 15 to the plates 10 and 12, as shown in Figures 2 and 4, and attached to or formed with the flanges 20 and 21 are base members 22 and 23 of couplings 24 and 25 by which the inner ends 26 of the battery cables 27 are connected. Caps 28 for securing the ends 26 of the cables 27 are provided and these are secured by nuts 29 which are threaded upon studs 30 formed with the members 22 and 23, as illustrated in Figures 1, 2, 3 and 5.

The paired opposingly arranged semi-conical sections 16 and 17, as shown in Figures 1 and 3, form a conical structure in which a ball conductor 31 is seated to close the electrical circuit between the conductors or cables 27, as in the manner shown in Figures 1 and 3. Obviously, when the ball 31, which is of a conductive material, is not seated in the conical structure there is no connection between the cables 27 and the electrical circuit from the battery 32 is broken thus disconnecting all of the electrical system of the vehicle, including the motor ignition circuit and other electrically controlled devices thereof. Such arrangement is demonstrated in Figures 4 and 6, and in dotted lines in Figure 1.

Situated immediately above the conical conductor, and in appropriate relationship thereto, is a magnet 33 which has a concavity 34 therein conformable to the spherical form of the conductor ball 31 and capable of receiving the same, as illustrated in Figures 4 and 6, and in dotted lines in Figure 1, and retaining this element in a position where no contact is completed between the cables 27, thus completely cutting off the battery circuit which provides electrical energy for the operation of the vehicle. The ball 31 will remain on the magnet, and out of contact with the members 16 and 17, until dislodged by some instrument such as a pin 35 inserted through apertures 36 in the top of the magnet 33, and an aperture 36' in the cover 18, as demonstrated in Figure 6. Any suitable device by which the ball 31 can be dislodged would be contemplated by the invention.

The cables 27 are provided with suitable attaching members 37 and 38, the latter being adapted for connection to a terminal of the battery 32, as shown in Figures 5 and 7, and have proper insulating grommets 39 in each side of the cover 18, as shown in Figure 5.

The magnet 33 is attached to a bracket 40 through a plate 41 which is secured by screws 42, or other device, the bracket 40 being secured by screws 15, in the manner shown in Figures 1, 2, 4 and 6.

It is contemplated that the invention may be modified in many respects, as to its structure and design, by persons skilled in the art, without departing from the spirit and intent of the invention or the scope of the appended claims.

What is claimed is:

1. In a circuit breaker device for motor vehicle circuits having a mounting plate and a pair of opposed semi-conical conductor plates forming a receptacle and providing a gap in said circuit, a conductive ball in said receptacle connecting said conductor plates to complete an electrical circuit therethrough, and magnet means restraining said ball from returning to said receptacle when dislodged therefrom.

2. In a device for breaking the electrical circuit of an automotive vehicle in an upset position, having a pair of conductor plates connected in said circuit and a ball providing contact therebetween, the said ball being capable of dislodgment from said plates in upset position of said vehicle, means associated with said receptacle magnetically restraining said ball from entering said receptacle until manually dislodged from said restraining means.

3. In a disconnector device for an automotive electrical circuit in event of upset of an automotive vehicle, having a pair of spaced semi-conical conductor plates forming a conical receptacle, a conductive ball reposing in said receptacle closing said electrical circuit and capable of dislodgment to open the same, magnetic means for restraining said ball from reentering said receptacle until manually released.

4. In a circuit breaker for automotive electrical circuits in upset position of an automotive vehicle, having a mounting plate and a pair of opposingly arranged semi-conical conductor plates forming a receptacle, a ball adapted to repose in said receptacle and close said electrical circuit and capable of being dislodged when said vehicle is upset, and magnetic means for restraining said ball from reentering said receptacle until manually released therefrom.

5. In a device for breaking the electrical circuit of an automobile in upset position, having a pair of opposingly formed semi-conical plates connected in said circuit and spaced to form a gap therein, a ball conductor reposing in said receptacle to close said circuit and capable of being dislodged from said receptacle, and magnetic means associated with said receptacle for restraining said ball from entering said receptacle when said automobile is upset until manually released.

References Cited in the file of this patent

UNITED STATES PATENTS

| | | |
|---|---|---|
| 2,182,300 | McCandless | Dec. 5, 1939 |
| 2,734,103 | Raynor | Feb. 7, 1956 |
| 2,763,744 | Sternburgh | Sept. 18, 1956 |

FOREIGN PATENTS

| | | |
|---|---|---|
| 662,160 | Germany | July 6, 1938 |